US008492460B2

(12) United States Patent
Maier et al.

(10) Patent No.: US 8,492,460 B2
(45) Date of Patent: Jul. 23, 2013

(54) FLUORINATED POLYMER BLOCKS FOR PEM APPLICATIONS

(75) Inventors: Gerhard Maier, Munich (DE); Markus Gross, Kaufbeuren (DE)

(73) Assignee: GM Global Technology Operations LLC, Detroit, MI (US)

( * ) Notice: Subject to any disclaimer, the term of this patent is extended or adjusted under 35 U.S.C. 154(b) by 1449 days.

(21) Appl. No.: 11/460,726

(22) Filed: Jul. 28, 2006

(65) Prior Publication Data

US 2008/0027152 A1    Jan. 31, 2008

(51) Int. Cl.
| E01C 7/26 | (2006.01) |
| B01J 49/00 | (2006.01) |
| C08J 5/20 | (2006.01) |

(52) U.S. Cl.
USPC .................................. 524/68; 521/25; 521/27

(58) Field of Classification Search
USPC ....... 423/414; 528/86, 167, 171, 219; 521/25, 521/27; 524/68
See application file for complete search history.

(56) References Cited

U.S. PATENT DOCUMENTS

| 4,331,746 | A | 5/1982 | Sheibley |
| 5,468,574 | A | 11/1995 | Ehrenberg et al. |
| 5,677,074 | A | 10/1997 | Serpico et al. |
| 6,579,948 | B1 | 6/2003 | Tan et al. |
| 6,630,265 | B1 | 10/2003 | Taft, III et al. |
| 6,671,989 | B2 | 1/2004 | Vanek et al. |
| 6,761,989 | B2 | 7/2004 | Terahura et al. |
| 7,459,505 | B2 * | 12/2008 | Maier et al. .................. 525/535 |
| 2001/0041279 | A1 | 11/2001 | Terahara |
| 2002/0007083 | A1 | 1/2002 | DesMarteau et al. |
| 2002/0155333 | A1 | 10/2002 | Fitts et al. |
| 2002/0160271 | A1 | 10/2002 | Frech et al. |
| 2002/0187377 | A1 | 12/2002 | Shinoda et al. |
| 2003/0013817 | A1 | 1/2003 | Lu |
| 2003/0031911 | A1 | 2/2003 | Ritts et al. |
| 2003/0044669 | A1 | 3/2003 | Hidaka et al. |
| 2003/0049511 | A1 | 3/2003 | Ritts et al. |
| 2003/0096149 | A1 | 5/2003 | Koyama et al. |
| 2003/0104280 | A1 | 6/2003 | Venkatesan et al. |
| 2003/0198858 | A1 | 10/2003 | Sun et al. |
| 2003/0219640 | A1 | 11/2003 | Nam et al. |
| 2003/0222048 | A1 | 12/2003 | Asakawa et al. |
| 2004/0005474 | A1 | 1/2004 | Charnock et al. |
| 2004/0005490 | A1 | 1/2004 | Fan et al. |
| 2004/0038107 | A1 | 2/2004 | Fan et al. |
| 2004/0050816 | A1 | 3/2004 | Asakawa et al. |
| 2004/0101730 | A1 | 5/2004 | Hirano et al. |
| 2004/0126666 | A1 | 7/2004 | Cao et al. |
| 2004/0138387 | A1 | 7/2004 | Terahara et al. |
| 2004/0186262 | A1 * | 9/2004 | Maier et al. .................. 528/86 |
| 2004/0202908 | A1 | 10/2004 | Schmitz et al. |
| 2006/0182678 | A1 * | 8/2006 | Shinoda et al. ............... 423/414 |

FOREIGN PATENT DOCUMENTS

| CA | 2 392 241 A1 | 1/2003 |
| CA | 2 415 355 A1 | 1/2003 |
| CA | 2 470 123 A1 | 6/2003 |
| CA | 2 470 125 A1 | 6/2003 |
| DE | 103 26 703 A1 | 2/2004 |
| EP | 1 113 517 A2 | 7/2001 |
| EP | 1 274 142 A2 | 1/2003 |
| EP | 1 274 147 A2 | 1/2003 |
| EP | 1 431 281 A1 | 6/2004 |
| FR | 2 811 323 A1 | 7/2000 |
| GB | 1 035 242 | 7/1966 |
| GB | 2 395 952 A | 6/2004 |
| JP | 08020704 | 3/1996 |
| JP | 2003-292608 A | 10/2003 |
| JP | 2005-060484 A | 3/2005 |
| JP | 2005139432 A | 6/2005 |
| JP | 2006096989 A | 4/2006 |
| JP | 2006252813 A | 9/2006 |
| WO | WO 97/50143 A1 | 12/1997 |
| WO | WO 00/05774 A1 | 2/2000 |
| WO | WO 01/19896 A1 | 3/2001 |
| WO | WO 01/70858 A2 | 9/2001 |
| WO | WO 02/05370 A1 | 1/2002 |
| WO | WO 02/087001 A2 | 10/2002 |
| WO | WO 03/030289 A2 | 4/2003 |
| WO | WO 03/050897 A2 | 6/2003 |
| WO | WO 03/054995 A1 | 7/2003 |
| WO | WO 03/097718 A1 | 11/2003 |
| WO | WO 03/097719 A1 | 11/2003 |
| WO | WO 2004/035662 A1 | 4/2004 |
| WO | WO 2004/042839 | 5/2004 |

OTHER PUBLICATIONS

Feng Wang, Taianlu Chen, Jiping Xy, "Sodium Sulfonate-Functional Poly(ether ketone)s", Macromol, Chem Phys. 199, 1421-1426 (1998).
Second Japanese Office Action, Japanese Patent Application No. JP2007-187955; dated Apr. 4, 2011; 2 pages.

* cited by examiner

*Primary Examiner* — Ling Choi
*Assistant Examiner* — Monique Peets
(74) *Attorney, Agent, or Firm* — BrooksGroup

(57) ABSTRACT

A fluorine-containing polymer segment includes at least one substituent for proton transfer that has one or more fluorine atoms. The fluorine-containing polymer segment is useful for forming hydrophilic polymer blocks that are used in block copolymers. Block copolymers useful for fuel cell applications incorporate the hydrophilic polymer blocks formed from the fluorine containing polymer segments.

16 Claims, No Drawings

FLUORINATED POLYMER BLOCKS FOR PEM APPLICATIONS

BACKGROUND OF THE INVENTION

1. Field of the Invention

The present invention relates to block copolymers that can be formed into ion conductive membranes for fuel cell applications.

2. Background Art

Fuel cells are used as an electrical power source in many applications. In particular, fuel cells are proposed for use in automobiles to replace internal combustion engines. In proton exchange membrane ("PEM") type fuel cells, hydrogen is supplied to the anode of the fuel cell and oxygen is supplied as the oxidant to the cathode. The oxygen can be either in a pure form ($O_2$) or air (a mixture of $O_2$ and $N_2$). PEM fuel cells typically have a membrane electrode assembly ("MEA") in which a solid polymer membrane has an anode catalyst on one face and a cathode catalyst on the opposite face. The MEA, in turn, is sandwiched between a pair of non-porous, electrically conductive elements or plates which (1) serve as current collectors for the anode and cathode, and (2) contain appropriate channels and/or openings formed therein for distributing the fuel cell's gaseous reactants over the surfaces of the respective anode and cathode catalysts.

In order to efficiently produce electricity, the polymer electrolyte membrane of a PEM fuel cell typically, must be thin, chemically stable, proton transmissive, non-electrically conductive, and gas impermeable. Moreover, during operation of the fuel cell, the PEM is exposed to rather severe conditions, which include, hydrolysis, oxidation and reduction (hydrogenation) that can lead to degradation of the polymer thereby reducing the lifetime of a polymer electrolyte membrane. The combination of these requirements imposes rather strict limitations on material choices for these membranes. Presently, there are relatively few polymer systems that provide even marginally acceptable results for the combination of these requirements. An example of a PEM is the Nafion membrane developed by DuPont in 1966 as a proton conductive membrane. This membrane is possibly the only advanced polymer electrolyte currently available for use in a membrane electrode assembly in a fuel cell.

Other polymer systems that may be used in PEM applications are found in U.S. Pat. No. 4,625,000 (the '000 patent), U.S. Pat. No. 6,090,895 (the '895 patent), and EP Patent No. 1,113, 517 A2 (the '517 patent). The '000 discloses a sulfonation procedure forming poly(ether sulfone)s that may be used in solid polymer electrolyte application. However, the '000 patent's post-sulfonation of preformed polymers offers little control of the position, number, and distribution of the sulfonic acid groups along the polymer backbone. Moreover, the water uptake of membranes prepared from post sulfonated polymers increases, leading to large dimensional changes as well as a reduction in strength as the degree of sulfonation increases.

The '895 patent discloses a process for making cross linked acidic polymers of sulfonated poly(ether ketone)s, sulfonated poly(ether sulfone)s, sulfonated polystyrenes, and other acidic polymers by cross linking with a species which generates an acidic functionality. However, this reference does not suggest an effective way to cast membranes from those cross linked sulfo-pendent aromatic polyethers.

The '517 patent discloses a polymer electrolyte containing a block copolymer comprising blocks having sulfonic acid groups and blocks having no sulfonic acid groups formed by post sulfonation of precursor block copolymers consisting of aliphatic and aromatic blocks. In this patent, the precursor block copolymers are sulfonated using concentrated sulfuric acid, which leads to the sulfonation of aromatic blocks. However, once again, this post sulfonation of aromatic blocks offers the little control of the position, number, and distribution of the sulfonic acid groups along the polymer backbone. Furthermore, this post sulfonation of precursor block copolymers also leads to the cleavage of chemical bonds of the aliphatic block.

Although some of the proton conducting membranes of the prior art function adequately in hydrogen fuel cells, these membranes tend to require high humidity (up to 100% relative humidity) for efficient long-term operation. Moreover, prior art membranes are not able to efficiently operate at temperatures above 80° C. for extended periods of time. This temperature limitation necessitates that these membranes be constantly cooled and that the fuel (i.e., hydrogen) and oxidant be humidified.

Accordingly, there exists a need for improved materials for forming polymer electrolyte membranes and for methods of forming such materials.

SUMMARY OF THE INVENTION

The present invention overcomes the problems encountered in the prior art by providing in one embodiment a fluorine-containing polymer segment. The fluorine-containing polymer segment of this embodiment includes at least one substituent for proton transfer having one or more fluorine atoms.

In another embodiment of the present invention, a block copolymer that can be formed into an ion-conductive membrane is provided. Advantageously, the block copolymer of this embodiment incorporates the polymer segments (and blocks) containing fluorine atoms set forth above. The block copolymer of this embodiment is characterized by having alternating hydrophobic and hydrophilic polymer blocks. Specifically, the block copolymer of this embodiment includes a first polymer block (i.e., a hydrophobic polymer block) and a second polymer block (i.e., a hydrophilic polymer block) attached to the first polymer block. The second polymer block includes the polymer segment of the invention repeated a plurality of times. As set forth below, the polymer blocks that are built from the fluorine-containing polymer segments are useful in fuel cell applications.

In another embodiment of the invention, an ion conducting membrane incorporating the block copolymers of the invention is provided. The ion conducting membrane is advantageously useable in a fuel cell, and in at least one embodiment, a hydrogen fuel cell, operating continuously at temperatures up to about 120° C. Membranes formed from the block copolymers of the invention are characterized by having a microphase separated morphology due to the alternating hydrophobic and hydrophilic polymer sequences. Moreover, the ion conducting membranes of this embodiment have higher proton conductivities at low relative humidities than random copolymers of similar composition.

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventors.

The term "block" as used herein means a portion of a macromolecule, comprising many constitutional units, that has at least one feature that is not present in adjacent portions.

The term "block macromolecule" as used herein means a macromolecule that is composed of blocks in linear sequence.

The term "block polymer" as used herein means a substance composed of block macromolecules.

The term "block copolymer" as used herein means a polymer in which adjacent blocks are constitutionally different, i.e., each of these blocks comprise constitutional units derived from different characteristic species of monomer or with different composition or sequence distribution of constitutional units.

The term "random copolymer" as used herein means a copolymer consisting of macromolecules in which the probability of finding a given repeating unit at any given site in the chain is independent of the nature of the adjacent units.

In an embodiment of the present invention, a polymer segment ("B") that includes at least one substituent for proton transfer having one or more fluorine atoms is provided. In a variation of the present embodiment, the one substituent for proton transfer having one or more fluorine atoms is a perfluorinated moiety. In another variation of this embodiment, the polymer segment B optionally includes additional substituents for proton transfer. Such additional substituents for proton transfer include, but are not limited to, acidic substituents and salts thereof. Salts in this context are salts of the conjugate bases to an acidic substituent. Examples of suitable additional substituents for proton transfer are sulfonic and phosphonic acid groups and salts thereof which include, but are not limited to, $-SO_3H$, $-SO_3^-M^+$, $-COOH$, $-COO^-M^+$, $-PO_3H_2$, $-PO_3H^-M^+$, $-PO_3^{2-}M_2^+$, $-PO_3^{2-}M^{2+}$, and combinations thereof. In these examples, M is a metal such as an alkali or alkaline-earth metal, ammonium, or alkylammonium. Particularly useful metals are sodium, potassium, lithium, and the like.

In another embodiment of the invention, a polymer block having formula I is provided:

$$D_w \qquad \qquad 1$$

wherein D is the polymer segment of the invention that includes at least one substituent for proton transfer having one or more fluorine atoms; and w is an integer. In one variation, w is an integer from about 1 to 300. In another variation, w is an integer from about 1 to 200. In yet another variation, w is an integer from about 10 to 200.

In still another embodiment, the present invention provides a block copolymer that can be formed into an ion-conductive membrane. In particular, block copolymers of the invention are particularly useful for forming ion conductive membranes to be used in PEM fuel cells. The block copolymers of this embodiment are characterized by having a sequence of alternating hydrophobic and hydrophilic blocks. These alternating segments are immiscible thereby inducing a microphase separated morphology in films cast from these materials. In a useful variation of the present embodiment, a block copolymer having formula 2a or 2b is used:

$$(A_mB_n)_p \qquad \qquad 2a$$

$$A_mB_nC_s \qquad \qquad 2b$$

wherein
A is a first polymer segment that is repeated m times to form first polymer block $A_m$ that is either hydrophobic or hydrophilic;
B is a second polymer segment that is repeated n times to form second polymer block $B_n$ that is either hydrophobic or hydrophilic;
C is a third polymer segment that is repeated s times to form third polymer block $C_s$ that is either hydrophobic or hydrophilic; and
m, n, p, s are each independently an integer. In one variation, m, n, s are each independently integer from about 1 to 300. In another variation, m, n, s are each independently an integer from about 1 to 200. In yet another variation, m, n, s are each independently an integer from about 10 to 200. Similarly, in one variation, p is an integer from about 1 to about 20. In another variation, p is an integer from about 1 to 10. In some variations, polymer blocks $A_m$ and $C_s$ are bonded to polymer block $B_n$. It has been discovered that the block copolymers of this embodiment are formable into an ion-conductive membrane that is useful for fuel cell applications, and in particular, for fuel cells operating at temperatures as high as 120° C.

The block copolymer described by formula 2a is further limited by the proviso that when A is hydrophobic, B is hydrophilic. Similarly, when A is hydrophilic, B is hydrophobic. Consistent with these two provisos, when A is hydrophilic, A includes a first substituent for proton transfer and when B is hydrophilic, B includes a second substituent for proton transfer wherein at least one of A and B is hydrophilic and includes at least one substituent for proton transfer having one or more fluorine atoms. The block copolymer described by formula 2b is further limited by the proviso that when A is hydrophobic, B is hydrophilic and C is hydrophobic. Similarly, when A is hydrophilic, B is hydrophobic and C is hydrophilic. Consistent with these two provisos, when A is hydrophilic, A includes a first substituent for proton transfer, when B is hydrophilic, B includes a second substituent for proton transfer, and when C is hydrophilic, C includes a third substituent for proton transfer wherein at least one of A, B, and C is hydrophilic and includes at least one substituent for proton transfer having one or more fluorine atoms.

In still another embodiment of the present invention, at least one of A, B, or C is hydrophilic and described by formula 3:

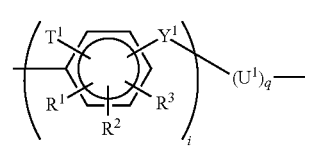

wherein:
$U^1$ is a moiety having at least one fluorine atom;
$Y^1$ is $-O-$, $-S-$, $-CO-$, $-SO_2-$, $-C(CH_3)_2-$, $-C(CF_3)_2-$, $-P(O)(T^1)-$, $-C(CH_3)(T^1)-$, $-P(O)(R^4)-$, diphenyl methylene, diphenyl silicon, fluorenyl, an alkylene, a bond directly to the next moiety, or

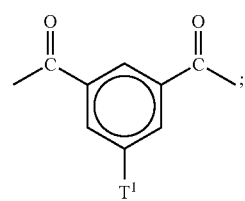

$R^1$, $R^2$, and $R^3$ are each independently H, $C_{1-10}$ alkyl, $C_{6-18}$ aryl, $C_{6-18}$ aralkyl, $SO_3H$, $-SO_3^-M^+$, $-COOH$, $-COO^-M^+$, $-PO_3H_2$, $-PO_3H^-M^+$, or $-PO_3^{2-}M_2^+$, $-PO_3^{2-}M^{2+}$;

$R^4$ is H, $C_{1-10}$ alkyl, $C_{6-18}$ aryl, or $C_{6-18}$ aralkyl;

$T^1$ is H or a moiety having at least one substituent for proton transfer;

i is an integer from 0 to 6; and q is an integer from 0 to 6, with the proviso that i and q are not both simultaneously 0 and that when q is 0, $T^1$ includes a moiety having at least one fluorine atom. The substituent for proton transfer included in $T^1$ includes a substituent for proton transfer having one or more fluorine atoms and the additional substituents for proton transfer set forth above.

The polymer segment having formula 3 is further limited with the proviso that when i>1, the $Y^1$ between sequential aromatic rings are the same or different; the $T^1$ on sequential aromatic rings are the same or different; the $R^1$, $R^2$, and $R^3$ on sequential aromatic rings are the same or different; and $T^1$ is a moiety having at least one substituent for proton transfer for at least one aromatic ring in B. Suitable substituents for proton transfer include substituents having fluorine atoms, $SO_3H$, $-SO_3^-M^+$, $-COOH$, $-COO^-M^+$, $-PO_3H_2$, $-PO_3H^-M^+$, $-PO_3^{2-}M_2^+$, or $-PO_3^{2-}M^{2+}$. The presence of a phosphonic acid group or related salt (i.e., $-PO_3H_2$, $-PO_3H^-M^+$, $-PO_3^{2-}M_2^+$, or $-PO_3^{2-}M^{2+}$) is particularly useful in $T^1$ or in $R^1$, $R^2$, and $R^3$. Since phosphonic acid is a dibasic acid with a weakly dissociating second acid group, an alternative mechanism for proton transport, which is not possible in monobasic acids such as sulfonic acid, is available. Moreover, this mechanism is expected to operate even at low water contents than when monobasic acids are used. Accordingly, such polymers exhibit higher proton conductivity at lower humidity and water content than polymers of similar structure with sulfonic acid groups. Although the beneficial effects of using phosphonic acid groups are not limited to any particular mechanism, the proton transport mechanism in the presence of phosphonic acid groups is believed to be a Grotthus mechanism that operates through chains of hydrogen bonds thereby requiring a non-dissociated group. In a variation of this embodiment, at least one of $R^1$, $R^2$, and $R^3$ is $-PO_3H_2$, $-PO_3H^-M^+$, $-PO_3^{2-}M_2^+$, or $-PO_3^{2-}M^{2+}$.

In a variation of this embodiment, $T^1$ is described by formula 4:

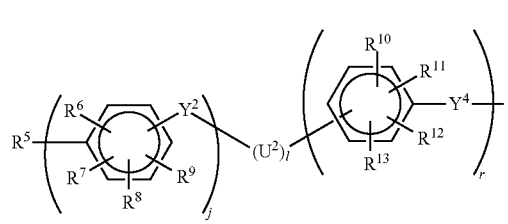

4 wherein:

$Y^2$ and $Y^4$ are each independently absent, $-O-$, $-S-$, $-CO-$, $-SO_2-$, $-C(CH_3)_2-$, $-C(CF_3)_2-$, $-P(O)(R^4)-$, diphenyl methylene, diphenyl silicon, fluorenyl, or an alkylene. When $Y^2$ and $Y^4$ are absent, adjacent moieties are directly bonded;

$U^2$ is a moiety having at least one fluorine atom;

$R^4$ is H, $C_{1-10}$ alkyl, $C_{6-18}$ aryl, or $C_{6-18}$ aralkyl;

$R^5$, $R^6$, $R^7$, $R^8$, $R^9$, $R^{10}$, $R^{11}$, $R^{12}$, and $R^{13}$ are each independently H, $CF_3$, $C_{1-10}$ alkyl, $C_{1-10}$ alkyl substituted with at least one fluorine atom, perfluorinated $C_{1-10}$ alkyl, $C_3$ cycloalkyl, $C_{1-10}$ cycloalkyl substituted with at least one fluorine atom, perfluorinated $C_{1-10}$ cycloalkyl, $C_{6-18}$ aryl, $C_{6-18}$ aryl substituted with at least one fluorine atom, perfluorinated $C_{6-18}$ aryl, $C_{6-18}$ aralkyl, $C_{6-18}$ aralkyl substituted with at least one fluorine atom, perfluorinated $C_{6-18}$ aralkyl, aryl$SO_3H$, $-SO_3^-M^+$, $-SO_3H$, $-COOH$, $-COO^-M^+$, $-PO_3H_2$, $-PO_3H^-M^+$, $-PO_3^{2-}M_2^+$, or $-PO_3^{2-}M^{2+}$;

M is a metal, ammonium, or alkylamonium;

j is an integer from 0 to 30;

l is an integer from 0 to 30;

r is an integer from 0 to 30; and

In a variation, at least one of j, l, and r is not zero. The moiety having formula 4 is further limited by the proviso that when j>1, the $Y^2$ between sequential aromatic rings are the same or different and the $R^5$, $R^6$, $R^7$, $R^8$, and $R^9$ on sequential aromatic rings are the same or different. Similarly, when q>1, the $Y^4$ between sequential aromatic rings are the same or different and the $R^5$, $R^6$, $R^7$, $R^8$, and $R^9$ on sequential aromatic rings are the same or different.

In another variation of the present embodiment, $U^1$ and $U^2$ of formulae 3 and 4, respectively, independently comprise a branched or unbranched alkyl substituted with at least one fluorine atom or a cycloalkyl substituted with at least one fluorine atom. Each of these groups will be at least divalent in order for to be incorporated into the polymer chain. In a refinement, $U^1$ and $U^2$ each independently comprise a branched or unbranched $C_{1-10}$ alkyl substituted with at least one fluorine atom or a $C_{3-15}$ cycloalkyl substituted with at least one fluorine atom. Each of the groups are optionally substituted with additional chemical groups. In a further refinement, $U^1$ and $U^2$ each independently comprise a perflurinated alkyl or perfluorinated cycloalkyl groups. Specific examples include perfluorinated cyclopropanyl, perfluorinated cyclobutyl, perfluorinated cyclopentyl, perfluorinated cyclohexyl (each of these substituents will be at least divalent). FIGS. 5-9 provide formulae for representative examples:

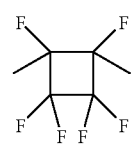

5

6

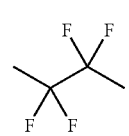

7

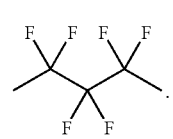

8

Formula 9 provides an example of a hydrophilic block consistent with Formulae 1 and 3:

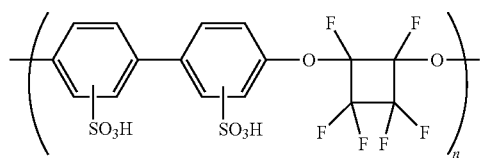

9

Formula 10 provides an example of a moiety consistent with Formula 4:

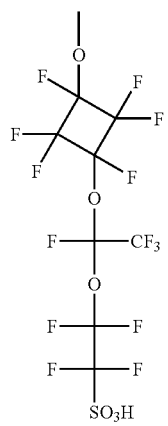

10

The cyclobutane structures having formulae 9 and 10 are advantageously formed by 2+2 cycloadditions as illustrated in Scheme 1:

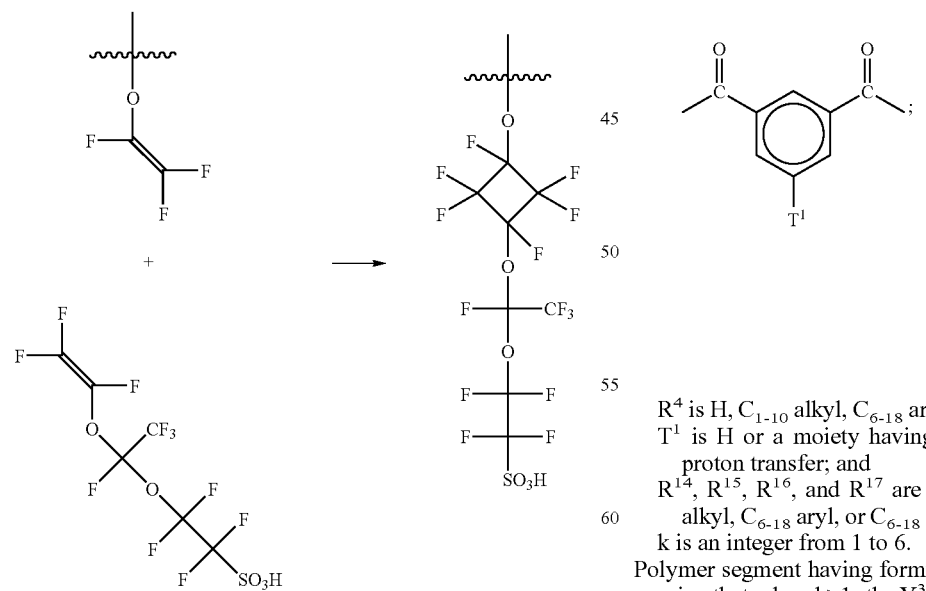

In a variation of the invention, polymer block $A_m$ has a molecular weight from about $5 \times 10^2$ to about $5 \times 10^5$ (g/mol), block $B_n$ has a molecular weight from about $5 \times 10^2$ to about $5 \times 10^5$ (g/mol) and polymer block $C_s$ has a molecular weight from about $5 \times 10^2$ to about $5 \times 10^5$ (g/mol). Moreover, the present embodiment is further characterized in that when polymer blocks $A_m$ and $C_s$ are hydrophobic and polymer block $B_n$ is hydrophilic and when polymer blocks $A_m$ and $C_s$ are hydrophilic and polymer block $B_n$ is hydrophobic.

Formula 11 gives an example of a hydrophobic block that may be used in a block copolymer with alternating hydrophobic and hydrophilic blocks that incorporates polymer segment B and polymer block $B_n$ of the present invention:

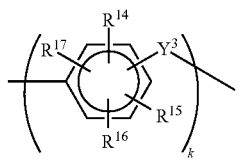

11 wherein:
Y³ is —O—, —S—, —CO—, —SO₂—, —C(CH₃)₂—, —C(CF₃)₂—, —P(O)(T¹)—, —C(CH₃)(T¹)—, —P(O)(R⁴)—, diphenyl methylene, diphenyl silicon, fluorenyl, an alkylene, a bond directly to the next aromatic ring, or ![structure with T¹]

R⁴ is H, $C_{1-10}$ alkyl, $C_{6-18}$ aryl, or $C_{6-18}$ aralkyl;
T¹ is H or a moiety having at least one substituent for proton transfer; and
R¹⁴, R¹⁵, R¹⁶, and R¹⁷ are each independently H, $C_{1-18}$ alkyl, $C_{6-18}$ aryl, or $C_{6-18}$ aralkyl;
k is an integer from 1 to 6.
Polymer segment having formula 4 is further limited by the proviso that when k>1, the Y³ between sequential aromatic rings are the same or different and the R¹⁴, R¹⁵, R¹⁶, and R¹⁷ on sequential aromatic rings are the same or different. Specific examples when A is hydrophobic are provided by formulae 12 through 15 and salts thereof:

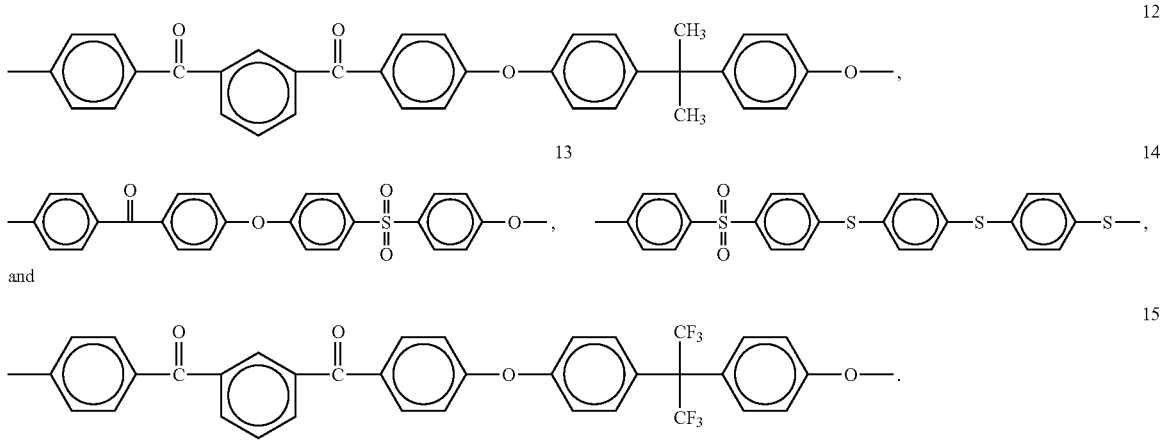

In another embodiment of the invention, the block copolymers set forth above are used to form an ion conductive membrane. As set forth above, the block copolymers of the invention are characterized by having alternating hydrophobic and hydrophilic polymer blocks that induce a microphase separated morphology when the polymers are formed into films. Due to this microphase separated morphology, the polymer segments with acidic groups are associated in hydrophilic domains that contain essentially no hydrophobic segments. Moreover, the local concentration of acidic groups in the hydrophobic domains is higher than in a randomly sulfonated polymer such as SPEEK. Also, water taken up by membranes will be present only in the hydrophilic domains and not in hydrophobic domains. Therefore, at a given overall IEC value and water content, the block copolymers will contain a higher local IEC and water level within the hydrophilic domains than compared to random copolymers. The microphase separated morphology includes, for example, morphologies such as spheres, cylinders, lamellae, ordered bi-continuous double diamond structures, and combinations thereof. The method of making such membranes begins first with preparation of the block copolymers of the present invention. In a variation of the invention a first polymer having formula 16 is prepared:

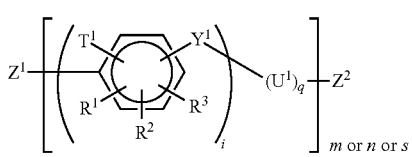

wherein $Z_1$ and $Z_2$ are each independently —H, $C_{1-10}$ alkyl, cycloalkyl, $C_{6-18}$ aryl, $C_{6-18}$ aralkyl, —SH, —S(O)N($R^{18}$)$_2$, F, Cl, Br, I, —NO$_2$, or —OH; and $R^{18}$ is H, $C_{1-10}$ alkyl, cycloalkyl, $C_{6-18}$ aryl, or $C_{6-18}$ aralkyl; and $T^1$, $R^1$, $R^2$, $R^3$, $Y^1$, U, q, m, n, s, and i are the same as set forth above. Similarly, an end functionalized second polymer block having formula 17 is also synthesized:

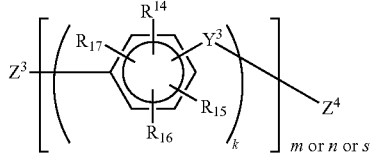

wherein $Z^3$ and $Z^4$ are each independently —H, $C_{1-10}$ alkyl, cycloalkyl, $C_{6-18}$ aryl, $C_{6-18}$ aralkyl, —SH, —S(O)N($R^{18}$)$_2$, F, Cl, Br, I, —NO$_2$, or —OH; and $R^{18}$ is H, $C_{1-10}$ alkyl, cycloalkyl, $C_{6-18}$ aryl, or $C_{6-18}$ aralkyl; and $R^{14}$, $R^{15}$, $R^{16}$, $R^{17}$, $Y^3$, m, n, s, and k are the same as those set forth above. It should be appreciated that m, n, or s are chosen in accordance to formulae 2a and 2b. The block copolymers in at least some embodiments of the invention are then prepared by reacting polymer block 16 with polymer block 17.

In another variation of the invention, the polymer block having formula 17 is reacted with one or more monomers suitable for forming the polymer block having formula 16. Specifically, the block copolymers of the invention having formula 1 are prepared by synthesizing an end-functionalized polymer block having formula 17:

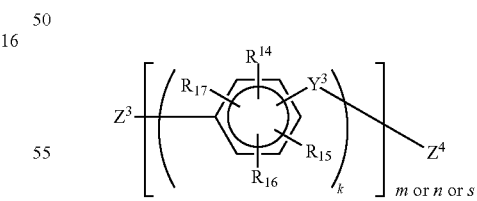

wherein $R^{14}$, $R^{15}$, $R^{16}$, $R^{17}$, $Y^3$, m, n, s, and k are the same as set forth above; $Z^3$ and $Z^4$ are each independently —H, $C_{1-10}$ alkyl, cycloalkyl, $C_{6-18}$ aryl, $C_{6-18}$ aralkyl, —SH, —S(O)N ($R^{18}$)$_2$, F, Cl, Br, I, —NO$_2$, or —OH; and $R^{18}$ is H, $C_{1-10}$ alkyl, cycloalkyl, $C_{6-18}$ aryl, or $C_{6-18}$ aralkyl. In this embodiment, the polymer block having formula 17 is then reacted with one or more monomers that polymerize into a block having formula 3:

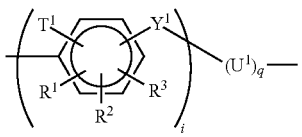

to form the block copolymer having formula 1, wherein $R^1$, $R^2$, $R^3$, $Y^1$, $T^1$, $U^1$, q, and i are the same as set forth above.

In yet another variation of this embodiment, the polymer block having formula 16 is reacted with one or more monomers suitable for forming the polymer block having formula 17. Specifically, the block copolymers in at least some embodiments of the invention are formed by synthesizing an end-functionalized polymer block having formula 16:

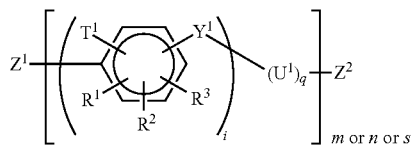

wherein $R^1$, $R^2$, $R^3$, $Y^1$, $T^1$, $U^1$, q, m, n, s, and i are the same as set forth above; $Z^1$ and $Z^2$ are each independently —H, $C_{1-10}$ alkyl, cycloalkyl, $C_{6-18}$ aryl, $C_{6-18}$ aralkyl, —SH, —S(O)N($R^{18}$)$_2$, F, Cl, Br, I, —NO$_2$, or —OH; and $R^{18}$ is H, $C_{1-10}$ alkyl, cycloalkyl, $C_{6-18}$ aryl, or $C_{6-18}$ aralkyl. In the embodiment, the polymer block having formula 16 is then reacted with one or more monomers that polymerize into a block having formula 11:

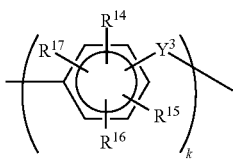

to form the block copolymer having formula 2A or 2B, wherein $R^{14}$, $R^{15}$, $R^{16}$, $R^{17}$, $Y^3$, and k are the same as set forth above.

In an example of the preparation of the block copolymer of at least some embodiments of the invention, hydrophobic block 17 is synthesized using one or more non-sulfonated bis-functional monomers. Such bis-functional monomer typically includes two groups that are halogens (F, Cl, Br, I), trifluorovinyl, and OH. The molecular mass (i.e. which is proportional to the number of repeating units) of the block is adjusted by using a defined stoichiometric ratio between the difunctional monomers preferably in the range of 1:2 to 200:1. After the reaction is completed the hydrophobic block is isolated by precipitation in a solvent such as methanol. Next the hydrophobic block is washed with excess amounts of the solvent (i.e., methanol) and subsequently with water. The dried hydrophobic block is used for the preparation of the multiblock copolymer together with the sulfonated monomers. Next, the dried hydrophobic first block is reacted with one or more monomers that include at least one fluorine atom. In another variation, the one or more monomers also incude at least one other substituent for proton transfer. In one variation, the monomer that includes at least one substituent for proton transfer is on a side chain as set forth above. In another variation, the monomer that includes at least one substituent for proton transfer is a —PO$_3$H$_2$, —PO$_3$H$^-$M$^+$, —PO$_3{}^{2-}$M$_2{}^+$, or —PO$_3{}^{2-}$M$^+$. Optionally, one or more additional bis-functional monomers that may or may not include substituents for proton transfer are also reacted with the monomer that does include a substituent for proton transfer. In at least one embodiment, in order to adjust the composition of the multiblock copolymer the necessary ratio between the monomers building the hydrophilic block and the hydrophobic block is used. The polymer is isolated by precipitation and purified in the same manner by precipitation into alcohol as for the hydrophobic blocks but without washing with water since the multiblocks especially when having a large hydrophilic block swell when in contact with water which results in difficulties in filtering the polymer. The resulting polymer flakes are thoroughly dried.

Regardless of the method by which the block copolymers of the invention are formed, the block copolymers are eventually formed or cast into an ion conductive membrane suitable for fuel cell applications. The polymer can be cast from solution in its acid, acid halide or salt form. In addition, a membrane can also be formed by hot pressing or by melt extrusion of the polymer. The behavior of the polymer during hot pressing or during melt extrusion can be improved by transferring the acidic groups in the polymer into ester groups or other protective groups, which can be returned into acid groups after melt processing. In one variation, the acid groups of the block copolymer are transformed to acid halide groups to form a modified block copolymer. Then a film is cast from a solution of the modified block copolymer onto a substrate. Finally, the acid halide groups are transformed back into the acid groups to form the ion conductive membrane. After formation of the multiblock copolymers of the present invention, ion conductive membranes can be formed. In a first refinement of this embodiment, the dried polymer is dissolved in a suitable solvent (i.e., DMSO). The polymer solution is then poured into a Petri dish and is covered with a lid in such a way that there is a small gap between the dish and the lid to allow for slow evaporation of the solvent. In another refinement, the dried polymer is also dissolved in a suitable solvent to form a viscous solution. The viscous solution is spread onto a glass plate and brought to a uniform thickness by means of a doctor blade. For both these refinements, the solvent is then removed by drying at elevated temperature in an oven. Finally, the morphology is adjusted by annealing the membrane at an elevated temperature. Typically, this annealing is performed at reduced pressures or in a vacuum. Useful annealing temperatures are either between the glass transition or melting temperatures of the two block types, or between the highest of the glass transition or melt temperatures of the two block types and the order-disorder transition temperature (if present). Temperatures between about 100° C. and 300° C. are useful with an optimal anneal temperature being about 200° C. In some variations of the invention, the after polycondensation steps, the multiblock copolymer of the invention is obtained a sulfonic acid salt or phosphorus acid salt. Therefore the membrane is converted into its free sulfonic acid form prior to use. This conversion is accomplished by containing the membranes with a diluted acid (e. g. 1 molar sulfuric acid) for 24 hours. Afterwards the membranes are rinsed thoroughly with DI water to remove excessive acid.

Ion conducting membranes formed by the polymers set forth in the examples can be characterized by the ion exchange capacity ("IEC"), water uptake, and specific conductivity.

Triblocks With Sulfonated Fluorinated Hydrophilic Middle Blocks ps 1. Synthesis of Triblocks with Perfluorocyclobutane (PFCB) Rings in the Main Chain:

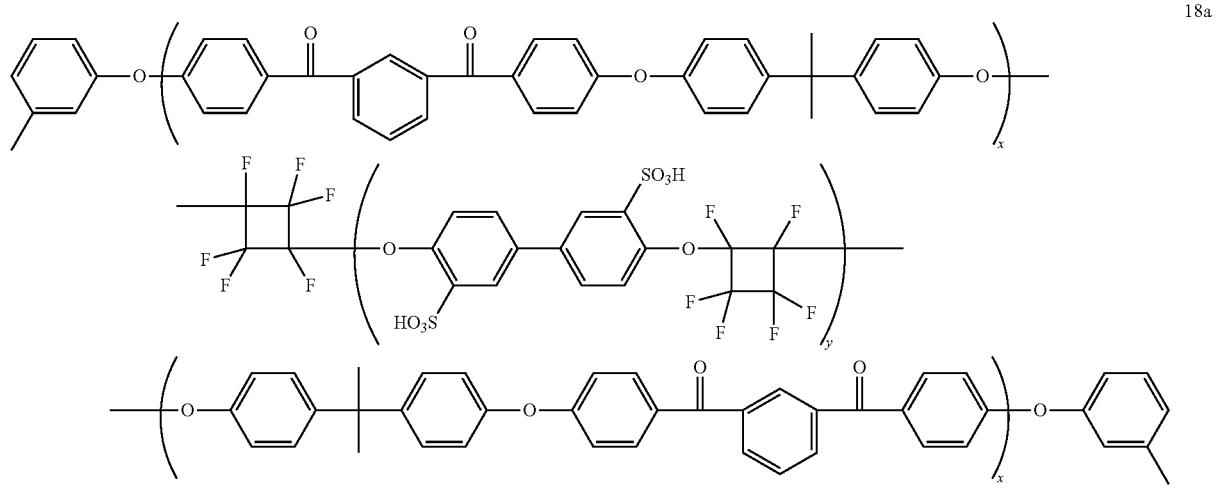

1.1 Synthesis of Monomers

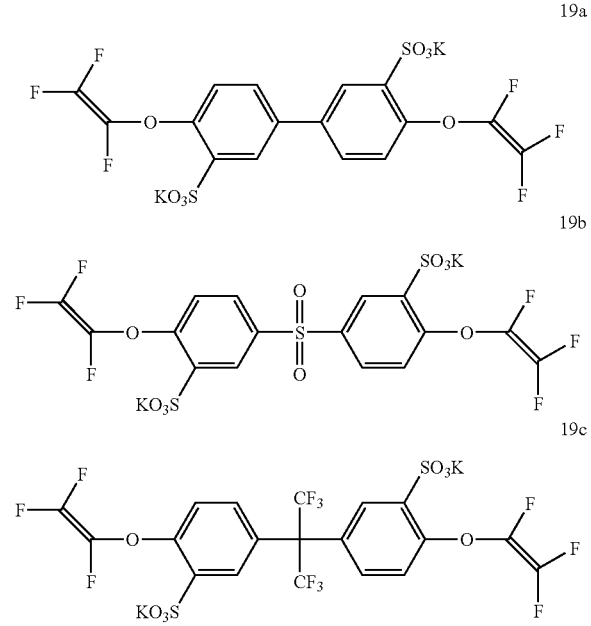

The di(trifluorovinyloxy) monomers are all synthesized according to the following procedure described for the monomer having formula 19a. About 100 g (0.537 mol) of biphenol, 30.1 g (0.537 mol) of KOH and 300 ml of anhydrous DMSO are added to a 1000 ml flask equipped with a Dean-Stark trap, reflux condenser, a nitrogen inlet and a mechanical stirrer. About 80 ml of cyclohexene are used as the azeotroping agent. The mixture is heated under a constant flow of nitrogen to 100° C. until a constant reflux of the cyclohexene is achieved. The system is dehydrated for 4 hours. Then the cyclohexene is distilled off and the mixture is cooled to about 30° C. About 307.4 g (1.18 mol) of 2,2'-dibromotetrafluoroethane is dissolved in anhydrous DMSO. This solution is added drop wise with constant cooling so that the temperature does not exceed 30° C. The solution is allowed to stir for 12 hours at room temperature and for another 10 hours at 35° C. before dilution with water. The solution is then extracted three times with methylene chloride and the combined organic phase are washed with water and dried over MgSO$_4$. After removal of the methylene chloride the crude product is fractionally distilled at about 140° C. and reduced pressure yielding 4,4'-di(2-bromotetrafluoroethoxy)biphenyl.

About 100 g (0.184 mol) of 4,4'-di(2-bromotetrafluoroethoxy)biphenyl are added to a 500 ml two-necked flask equipped with nitrogen inlet and outlet and a magnetic stir bar and are dissolved in 100 ml of sulfuric acid containing about 30% free SO$_3$. The reaction mixture is stirred for about 240 minutes at room temperature. The solution is then added slowly to a mixture of 250 g ice, 250 ml water and 250 g Ca(OH)$_2$ under vigorous stirring. Additional Ca(OH)$_2$ is added until the pH is 5 to 7. The resulting insoluble Ca$_2$SO$_4$ is filtered off and washed with water. A K$_2$CO$_3$ solution to the resulting filtrate is added until no precipitate occurs. The precipitate of Ca$_2$CO$_3$ is filtered off and washed with water. The water of the obtained filtrate is then distilled off and the resulting product is dried thoroughly at 80° C. in vacuum. The crude product is purified by recrystallization yielding 4,4'-di (2-bromotetrafluoroethoxy)-3,3'-biphenyl-di(potassium sulfonate).

About 100 g (0.128 mol) of 4,4'-bis(2-bromotetrafluoroethoxy)-3,3'-biphenyl-di(potassium sulfonate), 25 g (0.382 mol) of zinc powder and 500 ml of dry acetonitrile are added to a 1000 ml flask equipped with a magnetic stir bar, a nitrogen inlet and a reflux condenser. The mixture is stirred for two days under a nitrogen atmosphere at 120° C. After cooling, the mixture is diluted with methanol and the insoluble residue is filtered. Methanol and acetonitrile are distilled off and the resulting crude product is purified by recrystallization yielding 4,4'-di(trifluorovinyloxy)-3,3'-biphenyl-di(potassium sulfonate) (19a).

The synthesis of monomers having formulae (19b) and (19c) is performed in an analogous manner to the synthesis of 19a. The di(2-bromotetrafluoroethoxy) intermediate of (19b) is sulfonated at higher temperatures in order to make sure that the compound is disulfonated.

1.2. Synthesis of End-Functionalized Hydrophobic Blocks

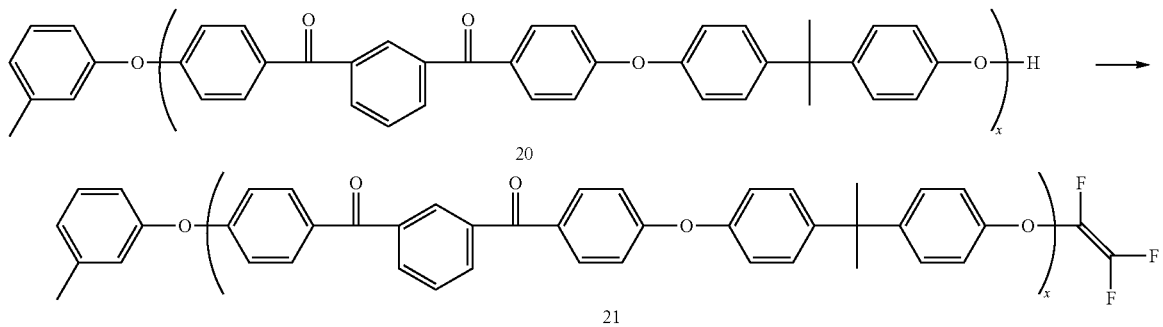

20

21 wherein x is an integer. 2,2-Bis-(4-hydroxy-phenyl)-propane (46.498 g, 0.2037 mol), 1,3-Bis-(4-fluorbenzoyl)benzene (65.648 g, 0.2037 mol), m-cresol (0.5523 g, 0.0051 mol, purity: 99,7%), potassium carbonate (62.70 g, 0.4537 mol), 360 ml anhydrous N-methyl-pyrrolidone ("NMP") and 75 ml anhydrous cyclohexene are added to a 1000 ml flask equipped with a Dean-Stark trap, a reflux condenser, a nitrogen inlet and a mechanical stirrer. The mixture is refluxed at 100° C. for 3 hours under nitrogen atmosphere. Cyclohexene is removed, and the mixture is heated for another 20 hours at 170° C. The mixture is filtered, diluted with 150 ml NMP and 150 ml tetrahydrofurane and poured into 3l methanol. The precipitated solid is washed with 5l methanol, 1l hot D.I. water and again with 1l methanol and dried at 100° C. in vacuum to yield mono-hydroxy terminated precursor polymer having formula 20 with x=40 on average.

About 100 g (≈5 mmol) of the mono-hydroxy terminated block (formula 20), 0.28 g (5 mmol) of KOH and 500 ml of anhydrous NMP are added to a 1000 ml flask equipped with a Dean-Stark trap, reflux condenser, a nitrogen inlet and a mechanical stirrer. 80 ml of cyclohexene is used as the azeotroping agent. The mixture is heated under a constant flow of nitrogen to 100° C. until a constant reflux of the cyclohexene is achieved. The system is dehydrated for 4 hours. Then the cyclohexene is distilled off and the mixture is cooled to room temperature before adding 2 g (7.5 mmol) of 2,2'-Dibromotetrafluoroethan dissolved in anhydrous NMP. The solution is allowed to stir for 24 hours at room temperature and for another 24 hours at 50° C. and precipitated by pouring it into 5l of methanol. The polymer is filtered and washed with methanol yielding 99 g of the 2-bromotetrafluoroethoxy-functionalized polymer.

The 99 g (≈5 mmol) of the above obtained polymer are dissolved in 500 ml of dry NMP and 0.5 g (7.5 mmol) of zinc powder are added to a 1000 ml flask equipped with a magnetic stir bar, a nitrogen inlet and a reflux condenser. The mixture iss stirred for two days under a nitrogen atmosphere at 120° C. After cooling to room temperature the mixture is filtered and poured again in 5l methanol. The precipitated polymer is filtered and washed yielding the polymer having formula 21.

2. Synthesis of Triblocks Having Formula 18a

EXAMPLE 1

About 17.48 g (30 mmol) of (19a) and 20 g (≈1 mmol) of the polymer having formula 20 are placed in a 250 ml flask equipped with a mechanical stirrer, a nitrogen inlet and a reflux condenser. 350 ml of anhydrous and deoxygenated NMP are then added under a constant flow of nitrogen. The mixture is heated to 200° C. for 16 hours and is then poured after cooling to room temperature into 3l of isopropanol to precipitate the crude polymer. After filtration and drying the polymer is purified by means of Soxhlett extraction, first with chloroform and subsequently with water. The resulting polymer is a polymer having formula 18a with x=40 (from Example 1.2) and y=33.

A membrane is cast from a DMSO solution onto a glass substrate. After the removal of the solvent at 120° C. and annealing at 200° C. a membrane is obtained which is then proton exchanged by placing it into a 1 molar sulfuric acid for 24 hours and washing it with D.I. water until the washing water is pH neutral.

EXAMPLES 2 AND 3

Polymers designated as polymers 18b and 18 are prepared in an analogous manner to the polymer having formula 18a with monomers (19b) and (19c) being substituted for monomer 19a, respectively.

Membranes are cast from a DMSO solution onto a glass substrate. After the removal of the solvent at 120° C. and annealing at 200° C. membranes are obtained which are proton exchanged by placing them into a 1 molar sulfuric acid for 24 hours and washing them with D.I. water until the washing water is pH neutral.

3. Triblocks with Perfluorosulfonic Acid Side Chains:

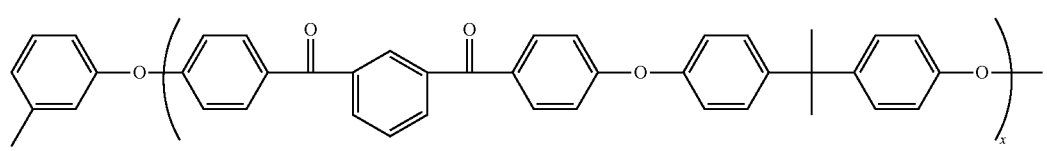

22

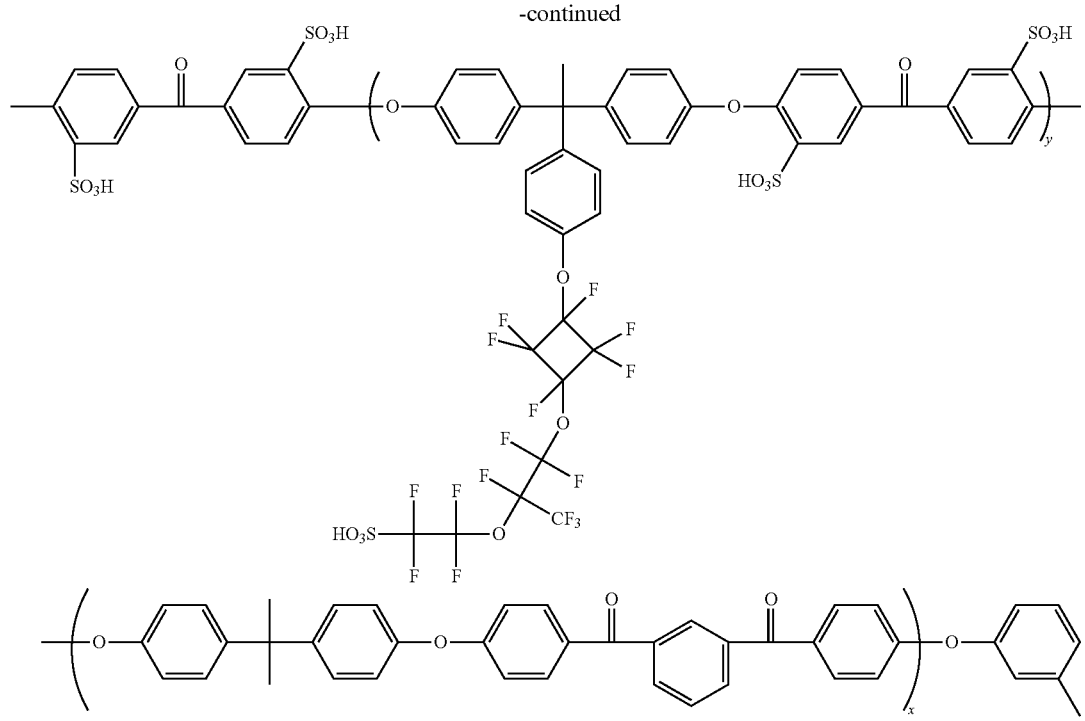

Synthesis of the perfluorocyclobutane side chain monomer

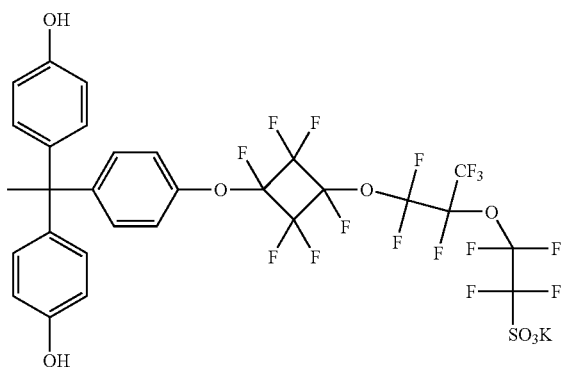

19d

About 100 g (0.326 mol) of 1,1,1-tris(4-hydroxyphenyl) ethane (THPE), 45.05 g (0.326 mol) of potassium carbonate and 300 ml of anhydrous DMSO are added to a 1000 ml flask equipped with a Dean-Stark trap, reflux condenser, a nitrogen inlet and a mechanical stirrer. About 80 ml of cyclohexene is used as the azeotroping agent. The mixture is heated under a constant flow of nitrogen to 100° C. until a constant reflux of the cyclohexene is achieved. The system is dehydrated for 4 hours. The cyclohexene is then distilled off and the resulting mixture is cooled to about 30° C. About 17 g (0.065 mol) of 2,2'-dibromotetrafluoroethane is dissolved in anhydrous DMSO. This solution is added dropwise. The solution is allowed to stir for 12 hours at room temperature and for another 10 hours at 35° C. before diluting it with water. It is then extracted three times with a suitable organic solvent and the combined organic layers are washed with water and dried over MgSO₄. After the removal of the solvent the crude product is purified by recrystallization yielding 1,1-di(4-hydroxyphenyl)-1-(4-(2-bromotetrafluoroethoxy)phenyl)ethane.

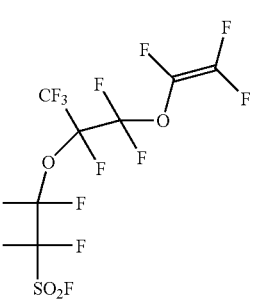

19e

The above obtained product is then coupled with the commercially available monomer having formula 19e yielding the desired monomer having formula 19d.

EXAMPLE 4

Synthesis of Triblocks Having Sulfonated Perfluoro-Cyclobutane Side Chains

About 41.0 g (2.0 mmol) of polymer 20 with x=40 (on average), 52.115 g (60.0 mmol) of (19d), 27.725 g (61.0 mmol) of 4,4'-difluoro-3,3'-di(potassium sulfonate)-benzophenone and 21.08 g (0.153 mol) of potassium carbonate, 300 ml anhydrous DMSO, 700 ml anhydrous NMP and 100 ml of anhydrous cyclohexene are added to a 2000 ml flask equipped with a Dean-Stark trap, reflux condenser, a mechanical stirrer and a nitrogen inlet. The mixture is refluxed at 140° C. for 4 hours under nitrogen. The benzene is removed and the mixture is heated for further 36 hours at 160° C. The mixture is filtered, diluted with DMSO and acidified with concentrated HCl. The solution is then poured into an excess amount of methanol under vigorous stirring. The precipitated solid is washed with methanol and dried at 100° C. in vacuum. In order to purify the triblock, a Soxhlett extraction first with chloroform and subsequently with water is conducted yielding the polymer having formula 22 with x=40 and y=60 on average.

Membranes are cast from solution on glass substrates. After drying at 120° C. the membranes are annealed at 200° C. under vacuum. The membranes are then proton exchanged by placing them into a 1 molar sulfuric acid for 24 hours and washing it with D.I. water until the wash water is pH neutral.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A block copolymer comprising a hydrophilic polymer block $D_w$, comprising a polymer segment D having formula 3:

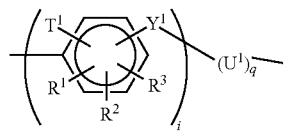

wherein:

U$^1$ comprises a cycloalkyl substituted with at least one fluorine atom;

Y$^1$ is —O—, —S—, —CO—, —SO$_2$—, —C(CH$_3$)$_2$—, —C(CF$_3$)$_2$—, —P(O)(T$^1$)—, —C(CH$_3$)(T$^1$)—, —P(O)(R$^4$)—, diphenyl methylene, diphenyl silicon, fluorenyl, an alkylene, a bond directly to the next moiety, or

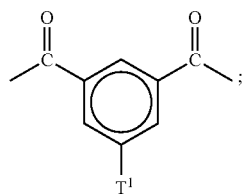

R$^1$, R$^2$, and R$^3$ are each independently H, C$_{1-10}$ alkyl, C$_{6-18}$ aryl, C$_{6-18}$ aralkyl, SO$_3$H, —SO$_3^-$M$^+$, —COOH, —COO$^-$M$^+$, —PO$_3$H$_2$, —PO$_3$H$^-$M$^+$, or —PO$_3^{2-}$M$_2^+$, —PO$_3^{2-}$M$^{2+}$;

R$^4$ is H, C$_{1-10}$ alkyl, C$_{6-18}$ aryl, or C$_{6-18}$ aralkyl;

T$^1$ comprises a component selected from the group consisting of substituents having fluorine atoms, —SO$_3$H, —SO$_3^-$M$^+$, —COOH, —COO$^-$M$^+$, —PO$_3$H$_2$, —PO$_3$H$^-$M$^+$, —PO$_3^{2-}$M$_2^+$, and —PO$_3^{2-}$M$^{2+}$ and M is an alkali or alkaline-earth metal, ammonium, or alkylammonium;

w is an integer greater than 1;

i is an integer from 1 to 6; and q is an integer from 1 to 6.

2. The block copolymer of claim 1 wherein T$^1$ is given by formula 4:

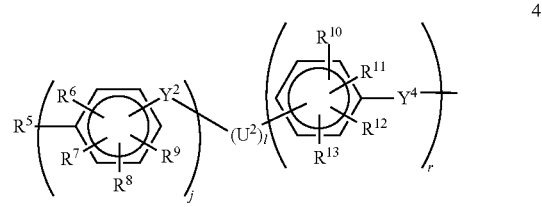

wherein:

Y$^2$ and Y$^4$ are each independently absent, —O—, —S—, —CO—, —SO$_2$—, —C(CH$_3$)$_2$—, —C(CF$_3$)$_2$—, —P(O)(R$^4$)—, diphenyl methylene, diphenyl silicon, fluorenyl, or an alkylene;

U$^2$ is a moiety having at least one fluorine atom;

R$^4$ is H, C$_{1-10}$ alkyl, C$_{6-18}$ aryl, or C$_{6-18}$ aralkyl;

R$^5$, R$^6$, R$^7$, R$^8$, R$^9$, R$^{10}$, R$^{11}$, R$^{12}$, and R$^{13}$ are each independently H, CF$_3$, C$_{1-10}$ alkyl, C$_{1-10}$ alkyl substituted with at least one fluorine atom, perfluorinated C$_{1-10}$ alkyl, C$_3$ cycloalkyl, C$_{1-10}$ cycloalkyl substituted with at least one fluorine atom, perfluorinated C$_{1-10}$ cycloalkyl, C$_{6-18}$ aryl, C$_{6-18}$ aryl substituted with at least one fluorine atom, perfluorinated C$_{6-18}$ aryl, C$_{6-18}$ aralkyl, C$_{6-18}$ aralkyl substituted with at least one fluorine atom, perfluorinated C$_{6-18}$ aralkyl, arylSO$_3$H, —SO$_3$H, —SO$_3^-$M$^+$, —COOH, —COO$^-$M$^+$, —PO$_3$H$_2$, —PO$_3$H$^-$M$^+$, —PO$_3^{2-}$M$_2^+$ or —PO$_3^{2-}$M$^{2+}$;

M is a metal, ammonium, or alkylamonium;

r is an integer from 0 to 30;

l is an integer from 0 to 30; and j is an integer from 0 to 30;

with the proviso that when j>1, the Y$^2$ between sequential aromatic rings are the same or different and the R$^5$, R$^6$, R$^7$, R$^8$, and R$^9$ on sequential aromatic rings are the same or different and when q>1, the Y$^4$ between sequential aromatic rings are the same or different and the R$^5$, R$^6$, R$^7$, R$^8$, and R$^9$ on sequential aromatic rings are the same or different.

3. The block copolymer of claim 2 wherein U$^1$ and U$^2$ each independently comprise a branched or unbranched alkyl substituted with at least one fluorine atom or a cycloalkyl substituted with at least one fluorine atom.

4. The block copolymer of claim 3 wherein U$^1$ and U$^2$ each independently comprise a branched or unbranched C$_{1-10}$ alkyl substituted with at least one fluorine atom or a C$_{3-15}$ cycloalkyl substituted with at least one fluorine atom.

5. The block copolymer of claim 3 wherein U$^1$ and U$^2$ each independently comprise a perfluorinated alkyl or perfluorinated cycloalkyl groups.

6. An ion conductive membrane made from the block copolymer of claim 1.

7. A block copolymer comprising a hydrophilic polymer block $D_w$, comprising a polymer segment D having formula 3:

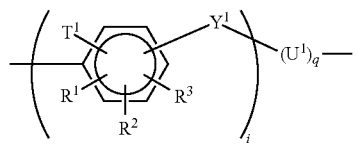

3 wherein:
$T^1$ is given by formula 4:

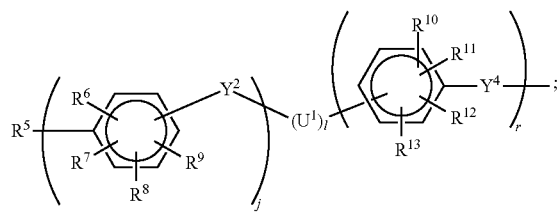

4

$Y^1$ is —O—, —S—, —CO—, —SO$_2$—, —C(CH$_3$)$_2$—, —C(CF$_3$)$_2$—, —P(O)(T$^1$)—, —C(CH$_3$)(T$^1$)—, —P(O)(R$^4$)—, diphenyl methylene, diphenyl silicon, fluorenyl, an alkylene, a bond directly to the next moiety, or

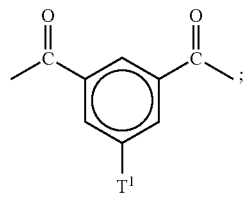

$Y^2$ and $Y^4$ are each independently absent, —O—, —S—, —CO—, —SO$_2$—, —C(CH$_3$)$_2$—, —C(CF$_3$)$_2$—, —P(O)(R$^4$)—, diphenyl methylene, diphenyl silicon, fluorenyl, or an alkylene;
$R^1$, $R^2$, and $R^3$ are each independently H, $C_{1-10}$ alkyl, $C_{6-18}$ aryl, $C_{6-18}$ aralkyl, SO$_3$H, —SO$_3^-$M$^+$, —COOH, —COO$^-$M$^+$, —PO$_3$H$_2$, —PO$_3$H$^-$M$^+$, or —PO$_3^{2-}$M$_2^+$, —PO$_3^{2-}$M$^{2+}$;
$R^4$ is H, $C_{1-10}$ alkyl, $C_{6-18}$ aryl, or $C_{6-18}$ aralkyl;
$R^5$, $R^6$, $R^7$, $R^8$, $R^9$, $R^{10}$, $R^{11}$, $R^{12}$, and $R^{13}$ are each independently H, CF$_3$, $C_{1-10}$ alkyl, $C_{1-10}$ alkyl substituted with at least one fluorine atom, perfluorinated $C_{1-10}$ alkyl, $C_3$ cycloalkyl, $C_{1-10}$ cycloalkyl substituted with at least one fluorine atom, perfluorinated $C_{1-10}$ cycloalkyl, $C_{6-18}$ aryl, $C_{6-18}$ aryl substituted with at least one fluorine atom, perfluorinated $C_{6-18}$ aryl, $C_{6-18}$ aralkyl, $C_{6-18}$ aralkyl substituted with at least one fluorine atom, perfluorinated $C_{6-18}$ aralkyl, arylSO$_3$H, —SO$_3$H, —SO$_3^-$M$^+$, —COOH, —COO$^-$M$^+$, —PO$_3$H$_2$, —PO$_3$H$^-$M$^+$, —PO$_3^{2-}$M$_2^+$, or —PO$_3^{2-}$M$^{2+}$;
w is an integer;
i is an integer from 1 to 6;
q is an integer from 1 to 6; and
M is a metal, ammonium, or alkylamonium;
r is an integer from 0 to 30;
l is an integer from 0 to 30;
j is an integer from 0 to 30;

with the proviso that when j>1, the $Y^2$ between sequential aromatic rings are the same or different and the $R^5$, $R^6$, $R^7$, $R^8$, and $R^9$ on sequential aromatic rings are the same or different and when q>1, the $Y^4$ between sequential aromatic rings are the same or different and the $R^5$, $R^6$, $R^7$, $R^8$, and $R^9$ on sequential aromatic rings are the same or different; and
$U^1$ and $U^2$ each independently comprise a moiety having formulae 5-8:

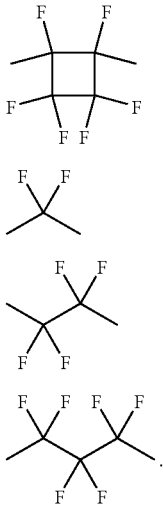

8. The block copolymer of claim 7, wherein block $D_w$ has formula 9:

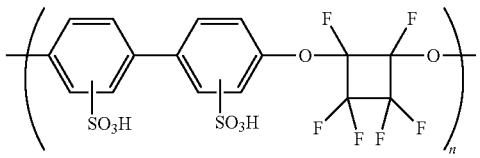

9 and n is an integer.

9. The block copolymer of claim 7 wherein $T^1$ comprises a moiety having formula 10:

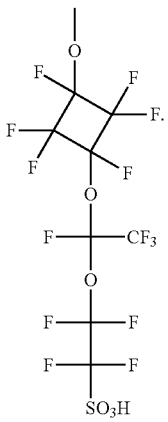

10

10. The block copolymer of claim 9 wherein the moiety having formula 10 is made by reaction scheme 1:

Scheme 1

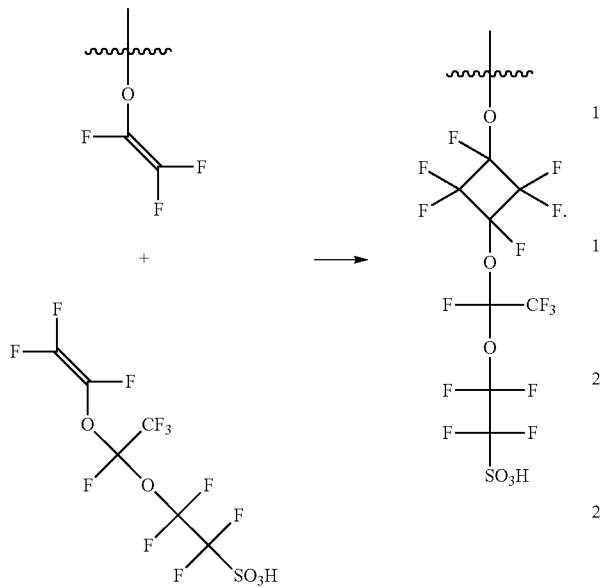

11. A block copolymer comprising a hydrophilic polymer block $D_w$, comprising a polymer segment D having formula 3:

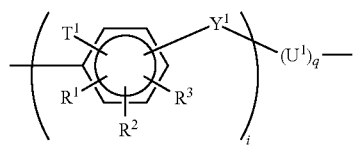
3 wherein:
$U^1$ is a moiety having at least one fluorine atom;
$Y^1$ is —O—, —S—, —CO—, —SO$_2$—, —C(CH$_3$)$_2$—, —C(CF$_3$)$_2$—, —P(O)(T$^1$)—, —C(CH$_3$)(T$^1$)—, —P(O)(R$^4$)—, diphenyl methylene, diphenyl silicon, fluorenyl, an alkylene, a bond directly to the next moiety, or

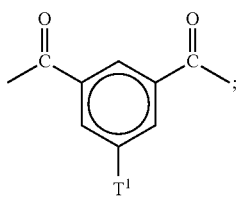

$R^1$, $R^2$, and $R^3$ are each independently H, $C_{1-10}$ alkyl, $C_{6-18}$ aryl, $C_{6-18}$ aralkyl, SO$_3$H, —SO$_3^-$M$^+$, —COOH, —COO$^-$M$^+$, —PO$_3$H$_2$, —PO$_3$H$^-$M$^+$, or —PO$_3^{2-}$M$_2^+$, —PO$_3^{2-}$M$^{2+}$;
$R^4$ is H, $C_{1-10}$ alkyl, $C_{6-18}$ aryl, or $C_{6-18}$ aralkyl;
$T^1$ comprises a component selected from the group consisting of substituents having fluorine atoms, —SO$_3$H, —SO$_3^-$M$^+$, —COOH, —COO$^-$M$^+$, —PO$_3$H$_2$, —PO$_3$H$^-$M$^+$, —PO$_3^{2-}$M$_2^+$, and —PO$_3^{2-}$M$^{2+}$ and M is an alkali or alkaline-earth metal, ammonium, or alkylammonium;
w is an integer greater than 1;
i is an integer from 3 to 6; and
q is an integer from 1 to 6.

12. A block copolymer comprising a hydrophilic polymer block $D_w$, comprising a polymer segment D having formula 3:

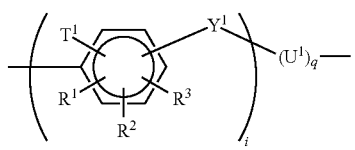
3 wherein:
$T^1$ is given by formula 4:

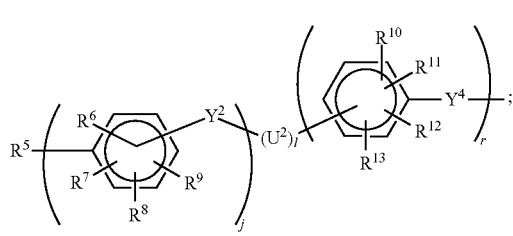
4

$Y^1$ is —O—, —S—, —CO—, —SO$_2$—, —C(CH$_3$)$_2$—, —C(CF$_3$)$_2$—, —P(O)(T$^1$)—, —C(CH$_3$)(T$^1$)—, —P(O)(R$^4$)—, diphenyl methylene, diphenyl silicon, fluorenyl, an alkylene, a bond directly to the next moiety, or

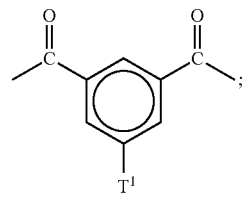

$Y^2$ and $Y^4$ are each independently absent, —O—, —S—, —CO—, —SO$_2$—, —C(CH$_3$)$_2$—, —C(CF$_3$)$_2$—, —P(O)(R$^4$)—, diphenyl methylene, diphenyl silicon, fluorenyl, or an alkylene;
$R^1$, $R^2$, and $R^3$ are each independently H, $C_{1-10}$ alkyl, $C_{6-18}$ aryl, $C_{6-18}$ aralkyl, SO$_3$H, —SO$_3^-$M$^{30}$, —COOH, —COO$^-$M$^-$, —PO$_3$H$_2$, —PO$_3$H$^-$M$^+$, or —PO$_3^{2-}$M$_2^+$, —PO$_3^{2-}$M$^+$;
$R^4$ is H, $C_{1-10}$ alkyl, $C_{6-18}$ aryl, or $C_{6-18}$ aralkyl;
$R^5$, $R^6$, $R^7$, $R^8$, $R^9$, $R^{10}$, $R^{11}$, $R^{12}$, and $R^{13}$ are each independently H, CF$_3$, $C_{1-10}$ alkyl, $C_{1-10}$ alkyl substituted with at least one fluorine atom, perfluorinated $C_{1-10}$ alkyl, $C_3$ cycloalkyl, $C_{1-10}$ cycloalkyl substituted with at least one fluorine atom, perfluorinated $C_{1-10}$ cycloalkyl, $C_{6-18}$ aryl, $C_{6-18}$ aryl substituted with at least one fluorine atom, perfluorinated $C_{6-18}$ aryl, $C_{6-18}$ aralkyl, $C_{6-18}$ aralkyl substituted with at least one fluorine atom, perfluorinated $C_{6-18}$ aralkyl, arylSO$_3$H, —SO$_3$H, —SO$_3^-$M$^+$, —COOH, —COO$^-$M$^+$, —PO$_3$H$_2$, —PO$_3$H$^-$M$^+$, —PO$_3^{2-}$M$_2^+$, or —PO$^{2-}$M$^{2+}$;

w is an integer;

i is an integer from 0 to 6;

q is an integer from 0 to 6, with the proviso that i and q are not both simultaneously 0 and that when q is 0, $T^1$ includes a moiety having at least one fluorine atom; and M is a metal, ammonium, or alkylamonium;

r is an integer from 0 to 30;

l is an integer from 0 to 30;

j is an integer from 0 to 30;

with the proviso that when j>1, the $Y^2$ between sequential aromatic rings are the same or different and the $R^5, R^6, R^7, R^8$, and $R^9$ on sequential aromatic rings are the same or different and when q>1, the $Y^4$ between sequential aromatic rings are the same or different and the $R^5, R^6, R^7, R^8$, and $R^9$ on sequential aromatic rings are the same or different; and $U^1$ and $U^2$ each independently comprise a moiety having formulae 5-8:

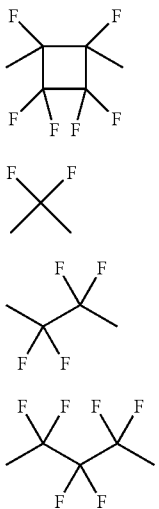

5

6

7

8 wherein block $D_w$ has formula 9:

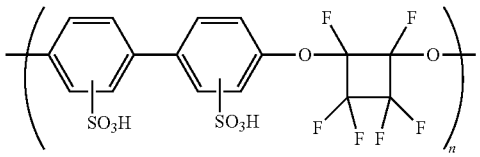

9 and n is an integer.

13. A block copolymer comprising a hydrophilic polymer block $D_w$, comprising a polymer segment D having formula 3:

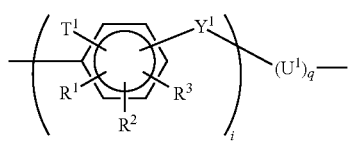

3 wherein:

$T^1$ is given by formula 4:

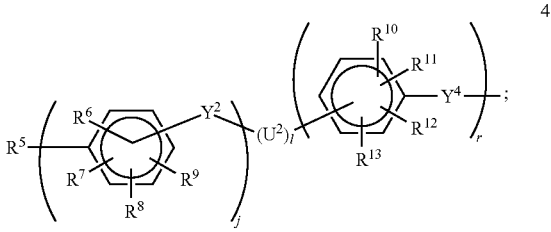

4

$Y^1$ is —O—, —S—, —CO—, —SO$_2$—, —C(CH$_3$)$_2$—, —C(CF$_3$)$_2$—, —P(O)(T$^1$)—, —C(CH$_3$)(T$^1$)—, —P(O)(R$^4$)—, diphenyl methylene, diphenyl silicon, fluorenyl, an alkylene, a bond directly to the next moiety, or

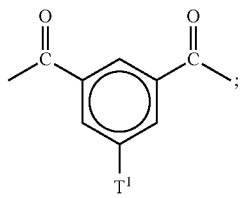

$Y^2$ and $Y^4$ are each independently absent, —O—, —S—, —CO—, —SO$_2$—, —C(CH$_3$)$_2$—, —C(CF$_3$)$_2$—, —P(O)(R$^4$)—, diphenyl methylene, diphenyl silicon, fluorenyl, or an alkylene;

$R^1, R^2$, and $R^3$ are each independently H, $C_{1-10}$ alkyl, $C_{6-18}$ aryl, $C_{6-18}$ aralkyl, SO$_3$H, —SO$_3^-$M$^+$, —COOH, —COO$^-$M$^+$, —PO$_3$H$_2$, —PO$_3$H$^-$M$^+$, or —PO$_3^{2-}$M$_2^+$, —PO$_3^{2-}$M$^{2+}$;

$R^4$ is H, $C_{1-10}$ alkyl, $C_{6-18}$ aryl, or $C_{6-18}$ aralkyl;

$R^5, R^6, R^7, R^8, R^9, R^{10}, R^{11}, R^{12}$, and $R^{13}$ are each independently H, CF$_3$, $C_{1-10}$ alkyl, $C_{1-10}$alkyl substituted with at least one fluorine atom, perfluorinated $C_{1-10}$ alkyl, $C_3$ cycloalkyl, $C_{1-10}$cycloalkyl substituted with at least one fluorine atom, perfluorinated $C_{1-10}$ cycloalkyl, $C_{6-18}$ aryl, $C_{6-18}$ aryl substituted with at least one fluorine atom, perfluorinated $C_{6-18}$ aryl, $C_{6-18}$ aralkyl, $C_{6-18}$aralkyl substituted with at least one fluorine atom, perfluorinated $C_{6-18}$ aralkyl, arylSO$_3$H, —SO$_3$H, —SO$_3^-$M$^+$, —COOH, —COO$^-$M$^+$, —PO$_3$H$_2$, —PO$_3$H$^-$M$^+$, —PO$_3^{2-}$M$_2^+$, or —PO$_3^{2-}$M$^{2+}$;

w is an integer;

i is an integer from 1 to 6;

q is an integer from 1 to 6; and

M is a metal, ammonium, or alkylamonium;

r is an integer from 0 to 30;

l is an integer from 0 to 30;

j is an integer from 0 to 30;

with the proviso that when j>1, the $Y^2$ between sequential aromatic rings are the same or different and the $R^5, R^6, R^7, R^8$, and $R^9$ on sequential aromatic rings are the same or different and when q>1, the $Y^4$ between sequential aromatic rings are the same or different and the $R^5, R^6, R^7, R^8$, and $R^9$ on sequential aromatic rings are the same or different; and $U^1$ and $U^2$ each independently comprise a moiety having formulae 5-8:

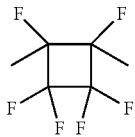

5

6

7

8 wherein $T^1$ comprises a moiety having formula 10:

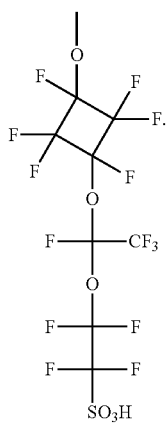

10

14. The block copolymer of claim 13 wherein the moiety having formula 10 is made by reaction scheme 1:

Scheme 1

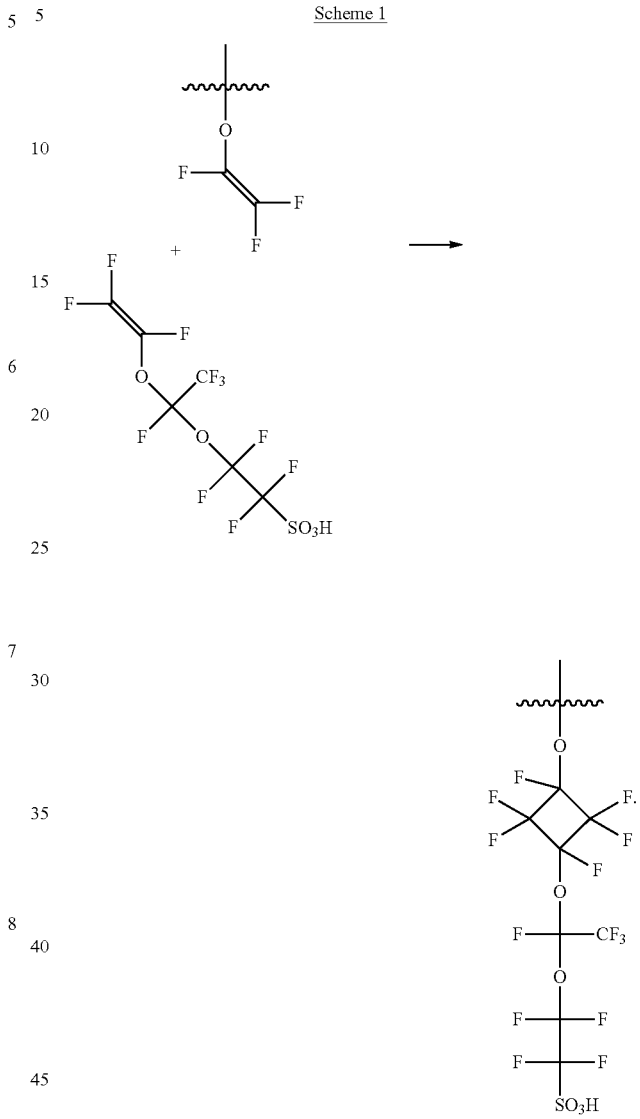

15. A block copolymer comprising a hydrophilic polymer block $D_w$, comprising a polymer segment D having formula 3:

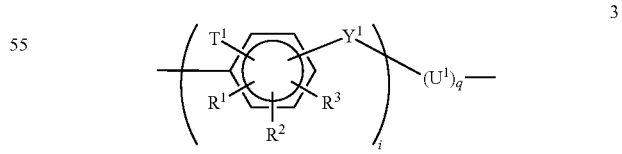

3 wherein:
$U^1$ is a moiety having at least one fluorine atom;
$Y^1$ is —O—, —S—, —CO—, —SO$_2$—, —C(CH$_3$)$_2$—, —C(CF$_3$)$_2$—, —P(O)(T$^1$)—, —C(CH$_3$)(T$^1$)—, —P(O)(R$^4$)—, diphenyl methylene, diphenyl silicon, fluorenyl, an alkylene, a bond directly to the next moiety, or

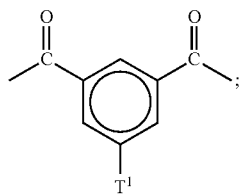

$R^1$, $R^2$, and $R^3$ are each independently H, $C_{1-10}$ alkyl, $C_{6-18}$ aryl, $C_{6-18}$ aralkyl, $SO_3H$, $-SO_3^-M^+$, $-COOH$, $-COO^-M^+$, $-PO_3H_2$, $-PO_3H^-M^+$, or $-PO_3^{2-}M_2^+$, $-PO_3^{2-}M^{2+}$;

$R^4$ is H, $C_{1-10}$ alkyl, $C_{6-18}$ aryl, or $C_{6-18}$ aralkyl;

$T^1$ comprises $T^1$ to include one of: a perflourinated acid, or a moiety that includes a cycloalkyl substituted with at least one fluorine atom:

w is an integer greater than 1;

i is an integer from 1 to 6; and q is an integer from 1 to 6.

16. A block copolymer comprising a hydrophilic polymer block $D_w$, comprising a polymer segment D having formula 3:

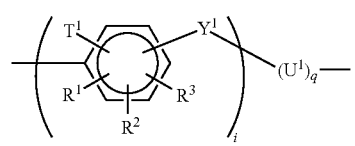

wherein:

$T^1$ is given by formula 4:

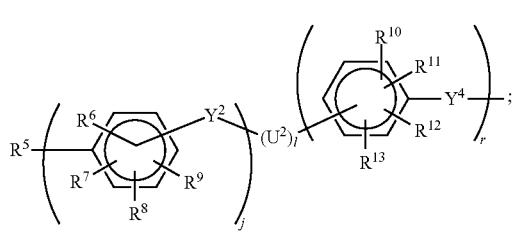

$Y^1$ is $-O-$, $-S-$, $-CO-$, $-SO_2-$, $-C(CH_3)_2-$, $-C(CF_3)_2-$, $-P(O)(T^1)-$, $-C(CH_3)(T^1)-$, $-P(O)(R^4)-$, diphenyl methylene, diphenyl silicon, fluorenyl, an alkylene, a bond directly to the next moiety, or

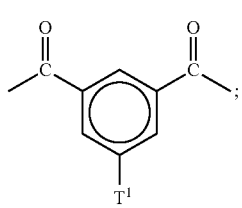

$Y^2$ and $Y^4$ are each independently absent, $-O-$, $-S-$, $-CO-$, $-SO_2-$, $-C(CH_3)_2-$, $-C(CF_3)_2-$, $-P(O)(R^4)-$, diphenyl methylene, diphenyl silicon, fluorenyl, or an alkylene;

$R^1$, $R^2$, and $R^3$ are each independently H, $C_{1-10}$ alkyl, $C_{6-18}$ aryl, $C_{6-18}$ aralkyl, $SO_3H$, $-SO_3^-M^+$, $-COOH$, $-COO^-M^+$, $-PO_3H_2$, $-PO_3H^-M^+$, or $-PO_3^{2-}M_2^+$, $-PO_3^{2-}M^{2+}$;

$R^4$ is H, $C_{1-10}$ alkyl, $C_{6-18}$ aryl, or $C_{6-18}$ aralkyl;

$R^5$, $R^6$, $R^7$, $R^8$, $R^9$, $R^{10}$, $R^{11}$, $R^{12}$, and $R^{13}$ are each independently H, $CF_3$, $C_{1-10}$ alkyl, $C_{1-10}$ alkyl substituted with at least one fluorine atom, perfluorinated $C_{1-10}$ alkyl, $C_3$ cycloalkyl, $C_{1-10}$ cycloalkyl substituted with at least one fluorine atom, perfluorinated $C_{1-10}$ cycloalkyl, $C_{6-18}$ aryl, $C_{6-18}$ aryl substituted with at least one fluorine atom, perfluorinated $C_{6-18}$ aryl, $C_{6-18}$ aralkyl, $C_{6-18}$ aralkyl substituted with at least one fluorine atom, perfluorinated $C_{6-18}$ aralkyl, aryl$SO_3H$, $-SO_3H$, $-SO_3^-M^+$, $-COOH$, $-COO^-M^+$, $-PO_3H_2$, $-PO_3H^-M^+$, $-PO_3^{2-}M_2^+$, or $-PO_3^{2-}M^{2+}$;

w is an integer;

i is an integer from 0 to 6;

q is an integer from 0 to 6, with the proviso that i and q are not both simultaneously 0 and that when q is 0, $T^1$ includes a moiety having at least one fluorine atom; and M is a metal, ammonium, or alkylamonium;

r is an integer from 0 to 30;

l is an integer from 0 to 30;

j is an integer from 0 to 30;

with the proviso that when j>1, the $Y^2$ between sequential aromatic rings are the same or different and the $R^5$, $R^6$, $R^7$, $R^8$, and $R^9$ on sequential aromatic rings are the same or different and when q>1, the $Y^4$ between sequential aromatic rings are the same or different and the $R^5$, $R^6$, $R^7$, $R^8$, and $R^9$ on sequential aromatic rings are the same or different; and $U^1$ and $U^2$ each independently comprise a moiety having formulae 5-8:

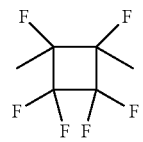

-continued
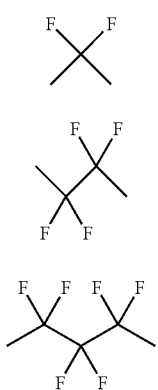
wherein T¹ comprises a moiety having formula 10:
and wherein the moiety having formula 10 is made by reaction scheme 1:
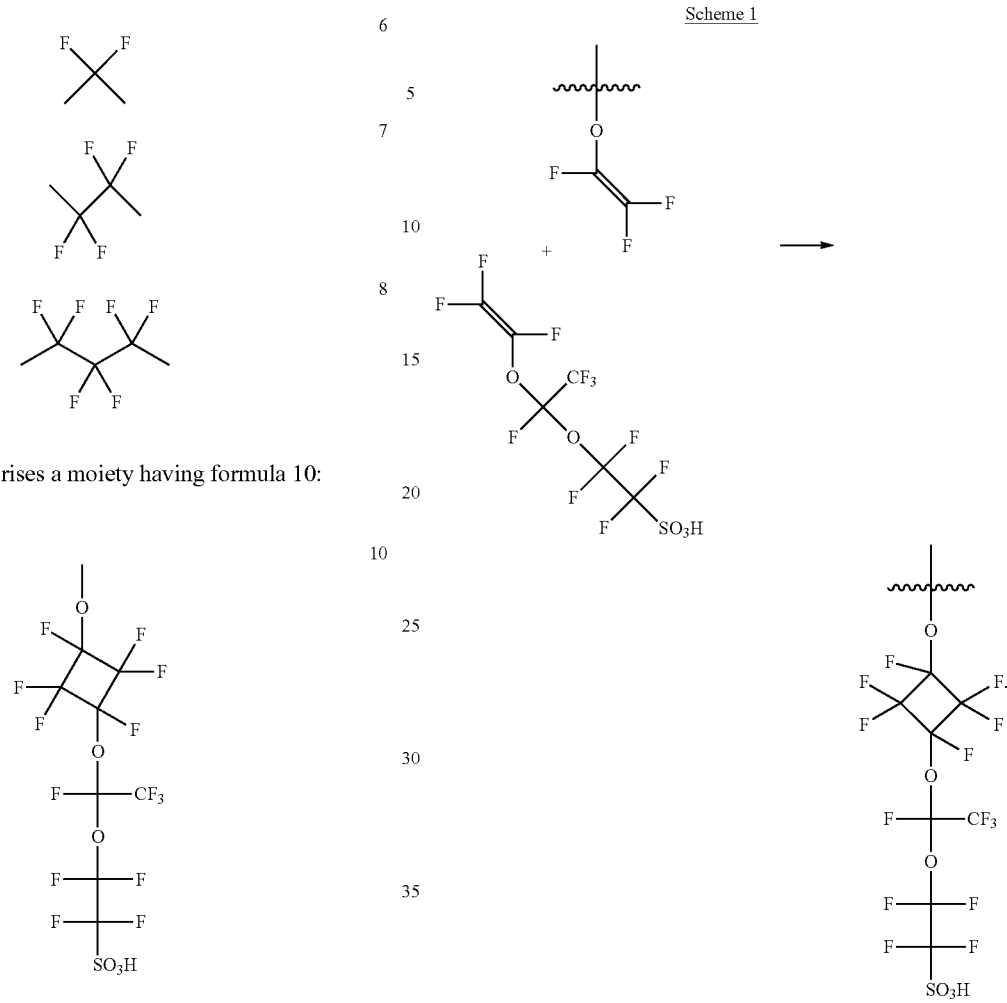
* * * * *